Figure 1:
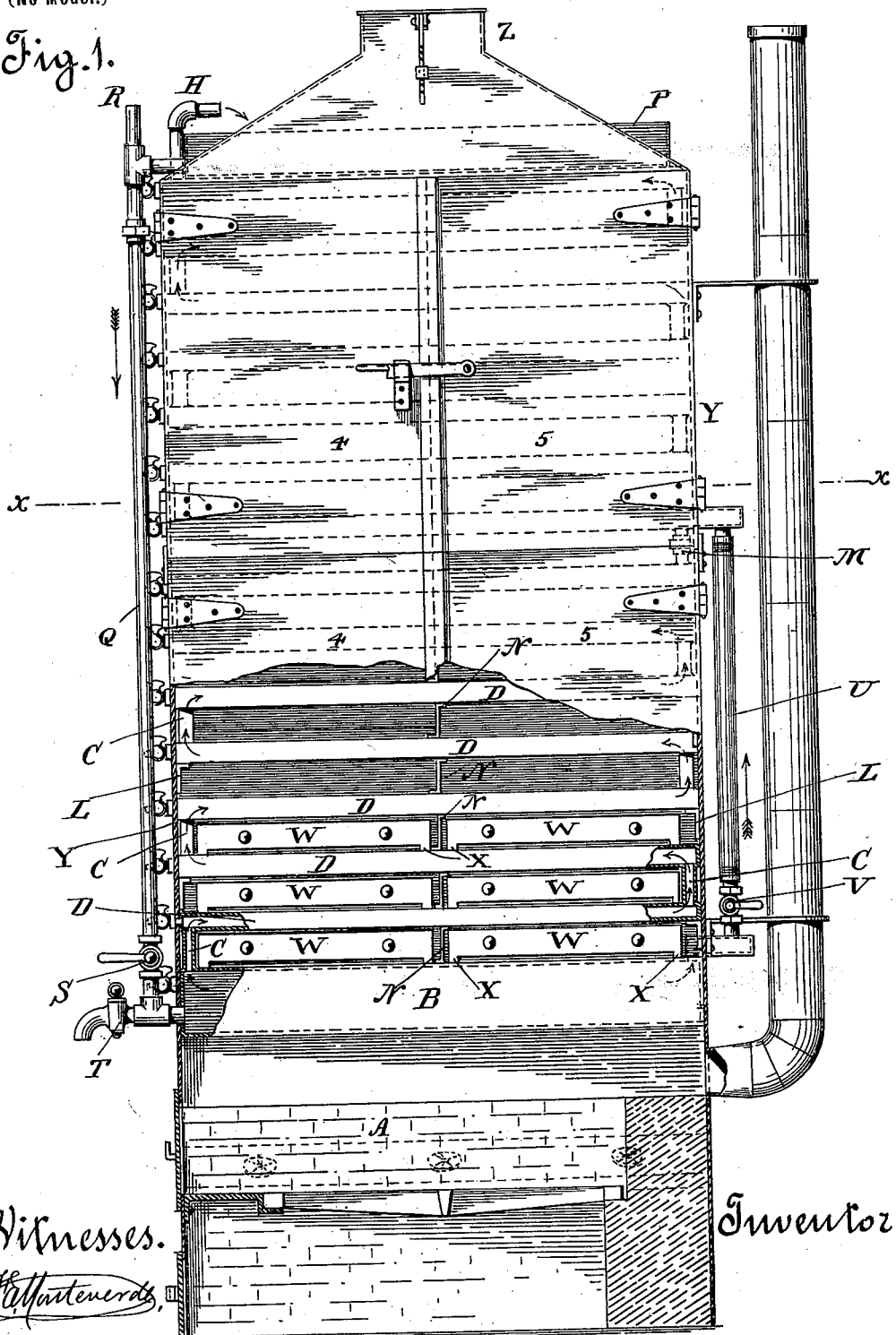

No. 645,531. Patented Mar. 13, 1900.
A. P. MERRILL.
EVAPORATOR.
(Application filed June 17, 1897.)
(No Model.) 5 Sheets—Sheet 1.

Witnesses. Inventor.
Albion Parris Merrill.

No. 645,531. Patented Mar. 13, 1900.
A. P. MERRILL.
EVAPORATOR.
(Application filed June 17, 1897.)

(No Model.) 5 Sheets—Sheet 2.

Witnesses.
T. E. Monteverde
A. H. Ste Marie.

Inventor.
Albion Parris Merrill.

No. 645,531. Patented Mar. 13, 1900.
A. P. MERRILL.
EVAPORATOR.
(Application filed June 17, 1897.)
(No Model.) 5 Sheets—Sheet 3.
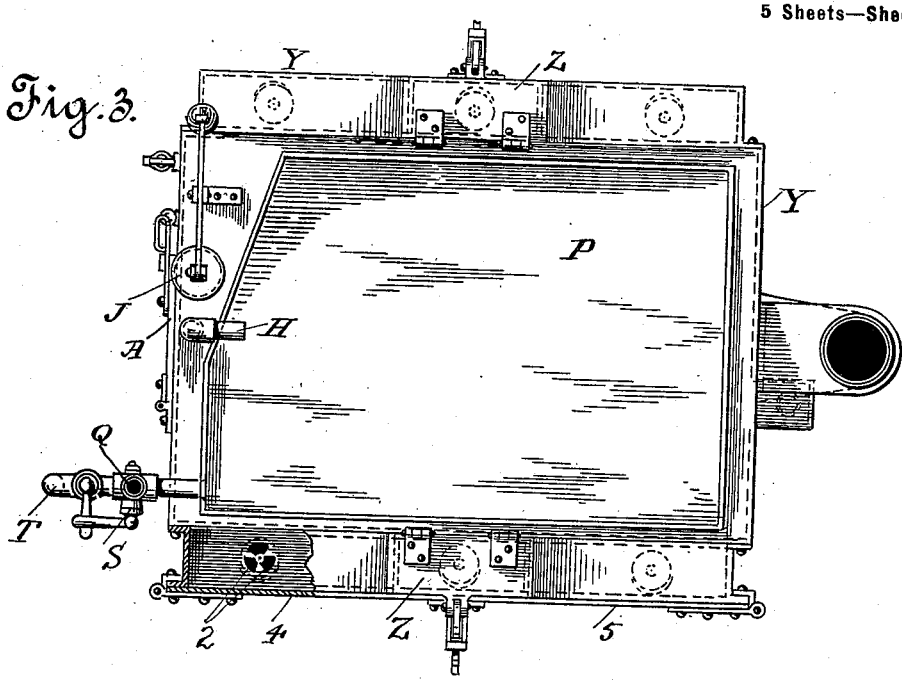
Fig. 3.
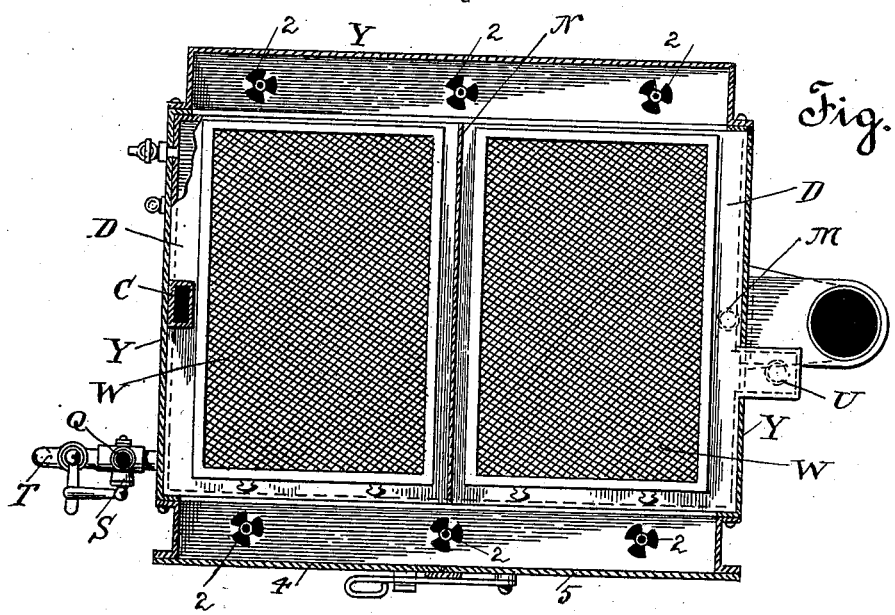
Fig. 4.
Fig. 5.
Witnesses. Inventor.
Albion Parris Merrill.

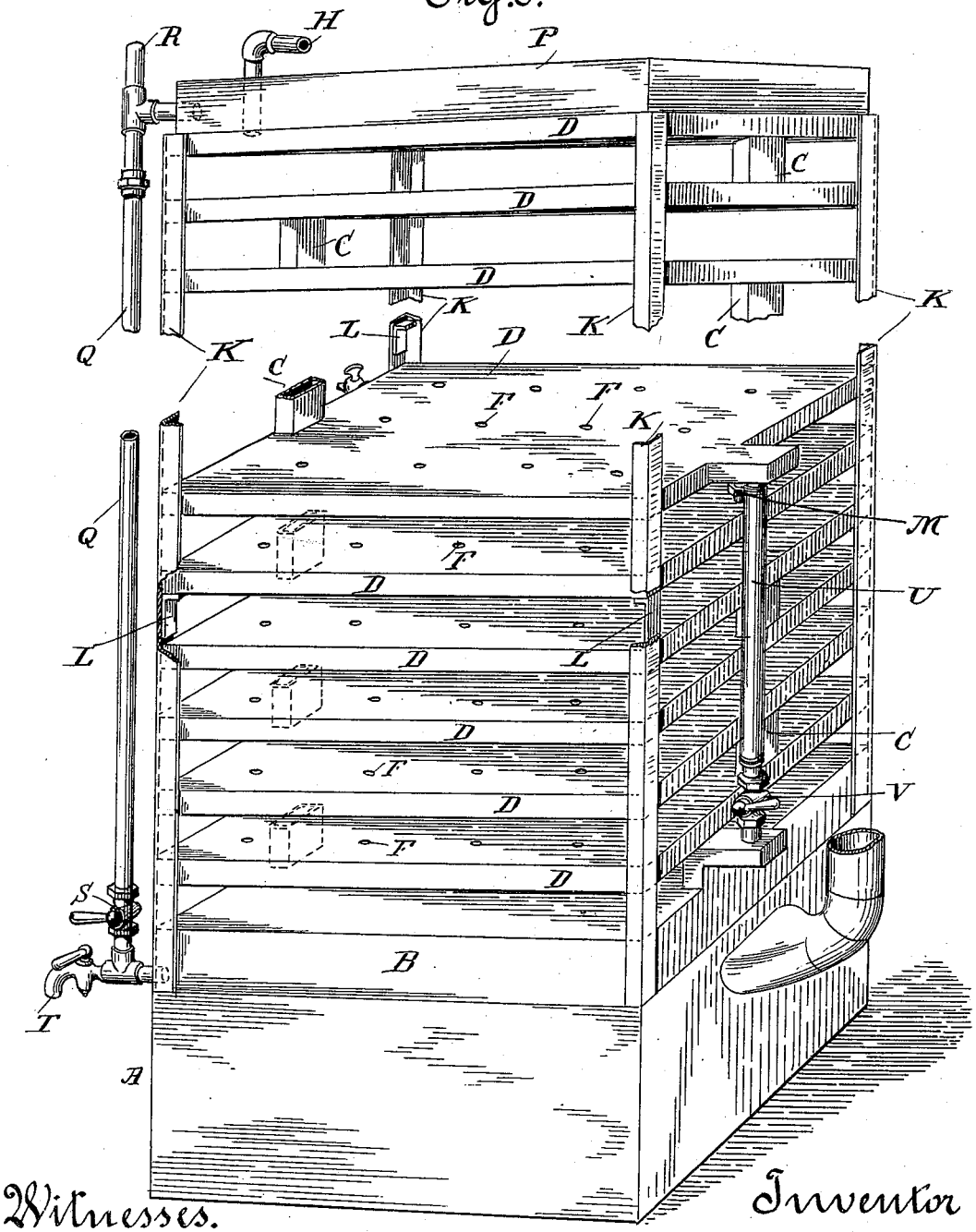

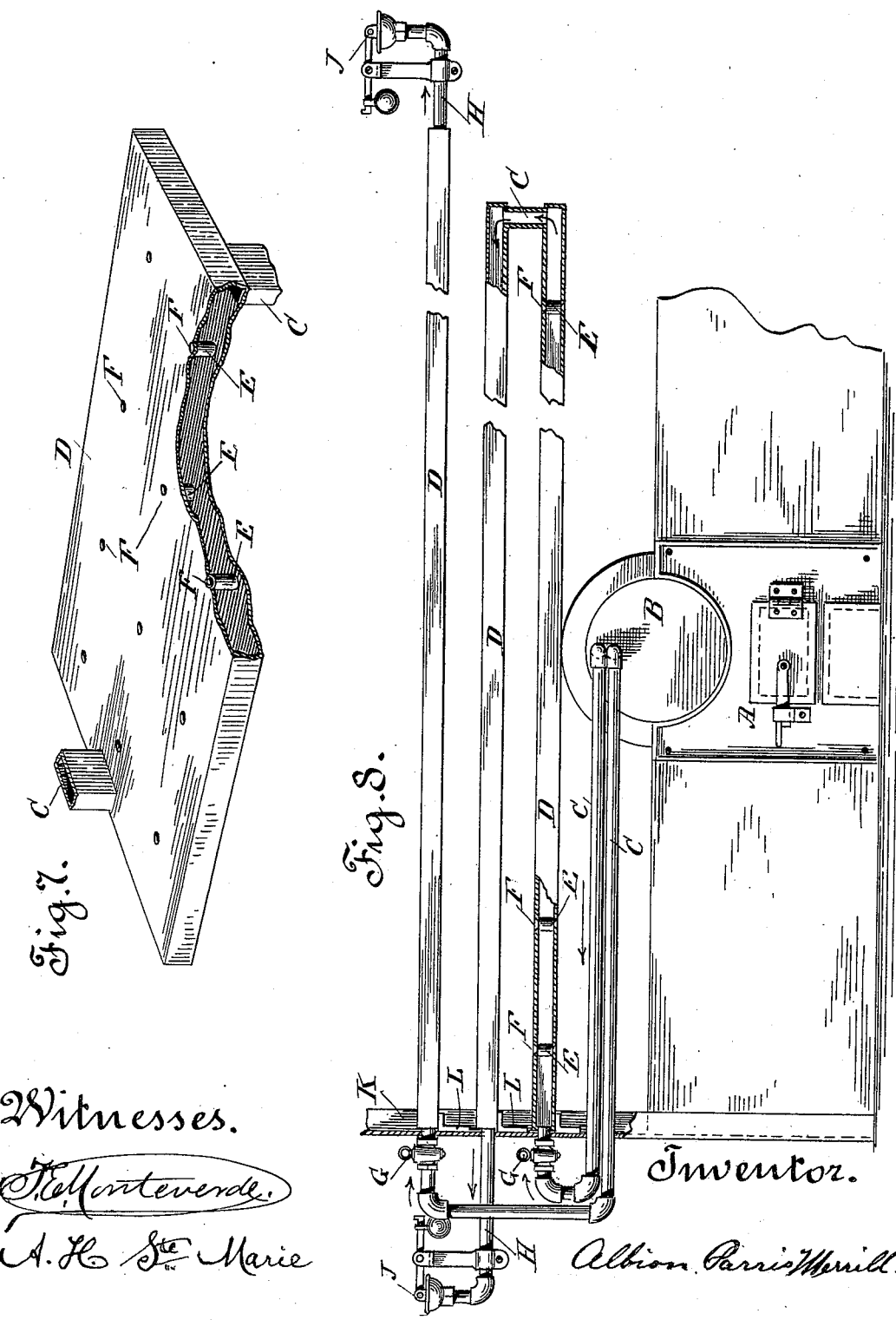

UNITED STATES PATENT OFFICE.

ALBION PARRIS MERRILL, OF SAN FRANCISCO, CALIFORNIA, ASSIGNOR OF ONE-HALF TO NOBLE HAMILTON, OF SAME PLACE.

EVAPORATOR.

SPECIFICATION forming part of Letters Patent No. 645,531, dated March 13, 1900.

Application filed June 17, 1897. Serial No. 641,155. (No model.)

*To all whom it may concern:*

Be it known that I, ALBION PARRIS MERRILL, a citizen of the United States, and a resident of the city and county of San Francisco, in the State of California, have invented a new and useful Evaporator, of which the following is a specification.

This invention has for its object improvements in apparatus for eliminating the watery portion or superfluous moisture from fruit and similar articles of food, so that the same will keep for a long time and may be stored away for future consumption.

I have observed that among the dried fruits of commerce few, if any, are ever found to be in prime condition, some being positively repugnant both to the eye and palate and all being more or less insipid, though sometimes they may be nice to look at, because they may have been picked and bleached. This apparent inferiority of dried fruit is directly traceable to the faulty construction of the apparatuses or machines employed for curing it, which often consist of a sort of kiln where the fruit is placed in a number of trays gathered in one inclosure, through which a current of heated dry air is caused to circulate. The hot air is thus forced to pass from one tray to another and soon gets heavily laden with the intermingled vapors arising from the fruit therein, with the result that the fruit last reached by the hot air becomes mushy and so charged with those vapors that it cannot be properly dried and, as a matter of fact, is blown up in drying and imperfectly cured, in time getting wormy and altogether unfit to eat. That part of it which the hot air first comes into contact with is also spoiled in that it is overdried or cooked too much, owing to the long exposure to heat necessary to drive the excess of moisture from the fruit last acted upon, and the consequence is the whole product comes out of the kiln or dryer in a defective state. The thought has therefore occurred to me that in order to be dried properly and uniformly fruit should be subjected to a low and even temperature all through, and, furthmore, disposed in lots or packages that are completely isolated one from another, so that the vapors from one may not intermix with the vapors from another and interfere with the evaporation in any one, each lot or package of fruit being acted upon by the drying agent as if it were in a separate dryer by itself. Hence my present improvement. The drying or curing agent which I have found most effective to carry out this idea is steam passed through a closed vessel or pan upon or near which is placed the fruit to be dried. Steam indirectly applied after this manner keeps the fruit at a temperature somewhat below the boiling-point of water and enables one to readily control its desiccation, so that the same may not be carried too far and allowed to deprive the fruit of its natural flavor. Besides steam confined in a pan can be led in any desired direction and the heat thereof applied to the fruit wherever it may be located, so that it is possible to distribute the fruit about the pan in trays, for instance, that are entirely separate one from another, and if several steam-pans are used they may be arranged to provide and afford a large number of drying-places, that are likewise distinct and disconnected, where a thousand and more trays of fruit may be cured independently one from another, the same as if but one steam-pan and one fruit-tray were employed. Carefully-conducted tests have conclusively proved to me the practical character of this mode of drying, and in carrying it out I have succeeded in making an apparatus wherein not only fruits, but vegetables and berries of various kinds as well, have been desiccated, both singly and different sorts at a time, with a uniform degree of excellence in all cases, the dried product being evenly cured, of fine appearance, and withal palatable and wholesome.

Figure 2:
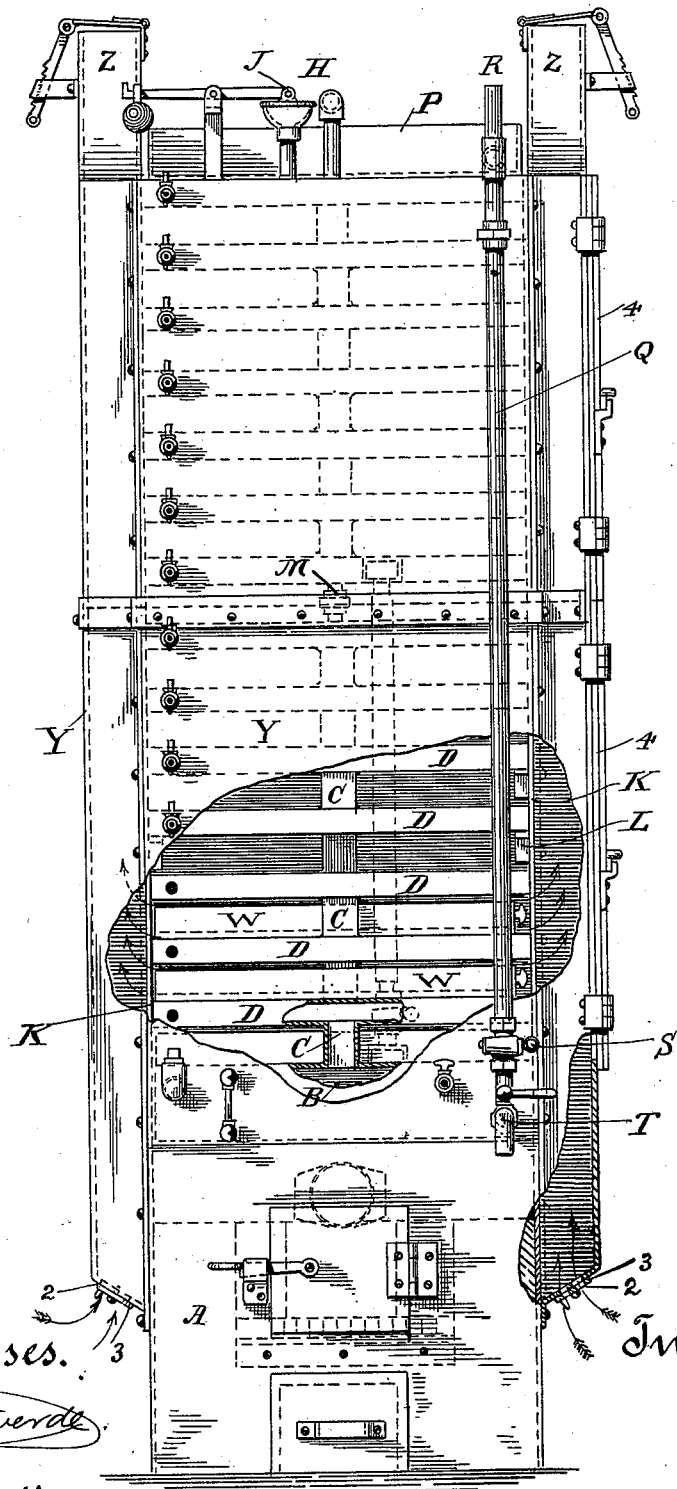

Referring now to the drawings hereunto annexed for a detailed description of my invention, Figure 1 is a partly-broken side elevation illustrating one form of evaporator adapted to carry out the method of drying outlined above. Fig. 2 is a front elevation of the same, also partly broken away. Fig. 3 is a top plan of the construction shown in the two preceding figures. Fig. 4 is a sectional plan taken on the line $x\ x$ of Fig. 1 looking downward. Fig. 5 is a perspective of one of the trays used in connection with the said evaporator. Fig. 6 is a broken perspective view of another form of evaporator built according to the principle of my invention, the same being entirely open. Fig. 7 is a broken perspective of a steam-pan constituting the essential part of said invention; and Fig. 8 is a broken side elevation of an evaporator of still different form, but also based upon and falling within the scope of my discovery.

In said figures the letter A represents the furnace or other source of heat connected with the boiler B, wherein is produced the steam utilized for the evaporation of the fruit. This boiler B may be of any approved pattern and located either close by or at some distance away from the evaporator, as found most convenient. The steam from the boiler is conveyed through one or more pipes C to a closed vessel or steam-pan D, which is preferably made in the shape of a hollow shelf and constitutes properly the evaporator—that is, in its simplest form. The dimensions of this steam-pan may be varied at will, as indicated in the various figures of the drawings; but I have found by experience that pans which are about four feet in length by two feet in width and one-half inch in thickness give very satisfactory results. One or more such pans may be employed, according to the different conditions under which they are to be used. Whatever is their number or their size they are preferably made, after the style illustrated at Fig. 7, of sheets of galvanized iron lock-seamed and soldered and stiffened or braced inside at suitable intervals by means of thimbles E, formed of coiled strips of metal, through which rivets F are passed. As already stated, the steam is admitted into said pans, whether used singly or in series, through a pipe or duct C, sometimes controlled by a stop-cock G, as shown in Fig. 8, and after circulating through the same passes out through an exhaust or outlet pipe H, which may or may not be provided with a safety-valve J, as preferred. If a single steam-pan be used, the valve J may be placed on the outlet-pipe located at the end of the pan opposite that through which the steam enters, as indicated in the upper part of Fig. 8. If, on the other hand, two or more pans are employed, as represented in the lower part of said Fig. 8, as also in Figs. 1, 2, and 6, the outlet-pipe of the pan or pans below the top one is used as a means of communication with the other pan or pans above and serves as an inlet for the steam to gain access to such other pan or pans, the outlet of one forming the inlet to the other in such a way that the ends of the sundry pans are joined together in alternate order and the outlet of the last or uppermost pan serves as the exhaust-pipe for the whole series.

In Fig. 2 two exhaust-pipes have been shown, one provided with a safety-valve and the other without such valve; but only one exhaust-pipe is to be used ordinarily. The advantage in having a safety-valve is that it can be regulated so as to secure any pressure of steam wanted in the evaporator, the steam escaping then only beyond a given pressure.

The steam-pan D aforesaid may be set up in any convenient position and supported in any suitable way. I deem it best, however, to place it directly above the boiler over the furnace, using for its support corner-posts consisting of angle-irons K, provided with small brackets L, each adapted to receive one corner of said pan. Where a number of steam-pans are to be used, I prefer to mount them all in the same way, placing them one above the other and connecting them with each other, as shown, though they need not be superimposed and may each have separate connection with the boiler, after the manner indicated on the left-hand side of Fig. 8. When superimposed, as represented in certain of the views of the subjoined drawings, I find that two and one-half inches is a good distance to leave between each of them. I find it advantageous, besides, to have a dozen of them or so firmly and permanently joined together, as this number of pans forms an evaporator of convenient size to handle, and the capacity of which can be easily enlarged by simply adding unto it another section similarly built, the two parts being fastened by a union-coupling M, as represented in Figs. 1, 2, and 6. Two or more sections can thus be readily coupled together, according to requirements. If the steam-pans in any section be at all large, I divide them by cross-partitions N. These transverse partitions answer the double purpose, first, of upholding or bracing up the pans between themselves, and, second, of creating separate spaces where the fruit, &c., can be dried in separate lots or packages, as aforesaid.

On top of the whole series of steam-pans, where a number of them are employed, I usually place a water-pan P, which also fills a twofold purpose. First, this water-pan can be utilized for filling the boiler B below through the pipe Q, interconnecting the same, although the boiler may be filled at the outset from some other source, if desired—say by coupling a water-hose with the upper end R of said pipe Q. In the second place such a water-pan can be made to receive and condense the exhausted steam from all the steam-pans beneath it by turning the upper outlet-pipe H into it, as shown in Figs. 1, 2, 3, and 6. It will be seen that owing to its very location the water-pan P will profit by the heat from the entire evaporator as also from the exhausted steam, and that any water which it may contain will consequently be in better condition to be turned into the boiler than cold water would be, requiring less time to become heated to the proper point, and therefore effecting a saving of fuel in this matter. Besides by having a small stream of the heated water from said water-pan running continually down the pipe Q or, in other words, establishing constant communication between the water-pan and the boiler, the latter will be kept sufficiently full always to make up for the loss of steam arising therefrom, so that part of the evaporator will work in a great measure automatically. A stop-cock S is placed on the pipe Q to regulate the flow of water through it, according to the requirements of the boiler. Another stop-cock T is likewise provided to drain the boiler whenever necessary. The water-pan P may, if preferred, be equipped with a suitable cover. (Not shown.)

The temperature of the steam circulating through the evaporator remains pretty even during its passage through the several pans. If not, many of the latter are used, and in such case is about the same in the top pan as in the bottom one, losing little or nothing of its heat while passing through the entire series, provided the evaporator be placed in a mild atmosphere; but when it has to pass through a large number of pans, especially if set up outdoors, the steam is likely to become colder as it ascends, and therefore to give out less heat as its gets farther away from the boiler. It then becomes important to provide means for maintaining its temperature even throughout regardless of the number of pans employed and under all conditions of location and weather. I therefore supplement my drying apparatus with what I have termed a "reinforcing-pipe" U, which is connected to any desired pan and turns steam into the same directly from the boiler. Such a reinforcing-pipe is represented at Figs. 1 and 6, and it is used in addition to the ordinary inlet-pipe C. Through such pipe one can turn steam directly into any one pan or series of pans with which the boiler is connected and reinforce or increase the pressure and heat of the steam therein. A stop-cock V enables the operator of the machine to regulate the flow of steam from the boiler to such pan or pans to suit. Any number of similar reinforcing-pipes may be used, though for the sake of clearness only one has been shown in the annexed drawings.

The parts above described constitute a complete evaporator in the sense that fruit and the like may be dried on it without other accessories simply by placing the things to be dried on top of or in contact with any steam-pan, as experiments have demonstrated; but of course it is more convenient, cleanly, and expeditious as a rule to use trays W, wherein to place the eatables that are to be dried, putting the same upon a single steam-pan or between two or more steam-pans, as may be deemed best. The form of tray which I have found the most useful and handy for this purpose is that illustrated in detail at Fig. 5 and in connection with the steam-pans in some of the other figures. As shown, this tray is composed of four wooden strips suitably fastened together to form its sides and ends and of wire-netting, which constitutes its bottom. It is made about two inches deep in order to allow one-half-inch clearance for it between any two pans. Now to divide this properly between the top and bottom of the tray I affix slats X to the under side of the latter, one on each side, upon which it is made to rest. These slats being made, say, a quarter-inch thick will raise the tray the same extent, and therefore leave a quarter-inch clearance both at top and bottom between the tray and the adjacent pans. The tray being set up in this way the fruit or other alimentary product spread therein is exposed properly on all sides to the mild heat emanating from the drying apparatus and soon gives out in vapor the superfluous moisture or aqueous substance which it may contain. When a number of trays are used, they are kept perfectly isolated, as already pointed out, either by intervening steam-pans or by the partitions N, which not only prevent contact between the several trays, but also prevent the vapors rising therefrom from intermixing. The contents of each tray are thus dried separately, and as the vapors from one cannot affect the contents of any other it follows that if the articles dried are of the same grade they must be uniformly cured. Furthermore, different things having different flavors or odors may be dried with the same evaporator at one and the same time without fear of having one article spoiling another, owing to intermixture of the vapors which they may emit.

The evaporator herein described may either be open, as illustrated at Figs. 6 and 8, or else inclosed in a jacket or casing, as represented at Figs. 1 to 4, according to circumstances. A jacket is useful chiefly where the evaporator is set up and worked outdoors, the main object in using it being to protect the apparatus from cold blasts or drafts of air, which might rob it of its heat or disturb the evenness of the temperature in it. By preference such a jacket is composed of sheets of galvanized iron Y, joined by angle-irons and bolts and placed at a suitable distance away from the trays and steam-pans. The intervening spaces between the walls of the jacket and the trays form ventilators which allow the vapors to escape by the sides of the evaporator and therefore permit the fruit to rid itself or become freed from its surplus moisture. The vapors naturally rise up to the top of the series of pans, where the jacket terminates in hoods Z, each of which is provided with an adjustable cover, as shown; but to further increase the draft and facilitate ventilation I provide holes 2 in the bottom of the jacket on either side, the same being controlled by shutters 3. Suitable doors, such as 4 and 5, are also provided in the jacket on the working side of the evaporator whenever a jacket is used, so that free access may be had to the steam-pans first for the insertion and afterward for the removal of the trays.

My improved evaporator is adapted to dry all sorts of fruit, vegetables, and berries, as already stated. It may likewise be used for curing coffee; but for this latter purpose its costruction is slightly modified in this way, that the steam-pans, the outer casing, and the other parts of the apparatus are set closer to one another, and the safety-valve is arranged so the pressure of steam will be somewhat increased and the temperature raised about the steam-pans.

Having described my invention, what I claim, and desire to secure by Letters Patent of the United States, is—

1. The combination of a plurality of superimposed steam-pans connected in series, a boiler below the same, a steam connection from said boiler to the lowermost pan, a substantially-flat water-pan above the topmost steam-pan, a connection from the latter to said water-pan, a connection from said water-pan direct to the boiler, and a steam connection from the boiler to one of said intermediate steam-pans, substantially as described.

2. The combination of a plurality of separated heating-shelves forming separated evaporating-spaces therebetween, supports for the shelves, a casing inclosing the shelves and forming therewith separated evaporating-compartments between the shelves closed by the casing at opposite sides, said casing being spaced from the shelves at one end to form a flue between the same and the shelves with which the evaporating-compartments independently connect, and means for causing a draft through said flue, substantially as and for the purpose set forth.

3. The combination of a plurality of superimposed steam-pans connected in series, a boiler below the same, a steam connection from said boiler to the lowermost pan, a substantially-flat water-pan above the topmost steam-pan, a connection from the latter to the said water-pan, and a connection from said water-pan to said boiler, substantially as and for the purpose set forth.

4. The combination of a plurality of separated heating-shelves forming evaporating-spaces therebetween, means for supporting the shelves, a casing inclosing the shelves and forming therewith separated evaporating-compartments between the shelves closed by the casing at two opposite sides, said casing being spaced from the opposite ends of the shelves to form flues between the same and the shelves with which said compartments independently connect, and means for causing a draft through said flues, substantially as and for the purpose set forth.

5. The combination of a series of superimposed steam-pans, a steam-supply therefor, corner supporting-posts for supporting said pans and holding the same separated to form evaporating-spaces therebetween, and an inclosing casing surrounding said pans and contacting with the opposite sides of the same to form separated evaporating-compartments between the pans closed at the opposite sides, said casing being spaced from said pans at the opposite ends thereof so as to form between the same and said pans, flues with which said evaporating-compartments independently connect, and means for causing a draft through said flues substantially as and for the purpose set forth.

In testimony whereof I affix my signature in presence of two witnesses.

ALBION PARRIS MERRILL.

Witnesses:
A. H. STE. MARIE,
HENRY P. TRICOU.